US007398808B2

(12) United States Patent
Cole, III

(10) Patent No.: US 7,398,808 B2
(45) Date of Patent: Jul. 15, 2008

(54) MICRO-CELLULAR CLOSED-CELL SPONGE RUBBER OUTERS

(76) Inventor: Charles D. Cole, III, 405 W. Palm Ave., Redlands, CA (US) 92373

( * ) Notice: Subject to any disclaimer, the term of this patent is extended or adjusted under 35 U.S.C. 154(b) by 356 days.

(21) Appl. No.: 10/416,419

(22) PCT Filed: Nov. 14, 2001

(86) PCT No.: PCT/US01/43636

§ 371 (c)(1),
(2), (4) Date: May 8, 2003

(87) PCT Pub. No.: WO02/40581

PCT Pub. Date: May 23, 2002

(65) Prior Publication Data

US 2004/0040638 A1 Mar. 4, 2004

Related U.S. Application Data

(60) Provisional application No. 60/248,401, filed on Nov. 14, 2000.

(51) Int. Cl.
*B29D 30/52* (2006.01)
*B60C 1/00* (2006.01)
*B60C 11/00* (2006.01)

(52) U.S. Cl. .............................. 152/209.7; 152/209.11; 156/123; 156/128.1

(58) Field of Classification Search ................. 156/123, 156/128.1, 128.6, 129, 125; 152/209.6, 209.7, 152/209.11
See application file for complete search history.

(56) References Cited

U.S. PATENT DOCUMENTS

| | | | | |
|---|---|---|---|---|
| 4,043,058 | A | 8/1977 | Hollister et al. | 36/102 |
| 4,212,787 | A | 7/1980 | Matsuda et al. | |
| 4,249,588 | A * | 2/1981 | Egan | 156/123 |
| 4,302,892 | A | 12/1981 | Adamik | |
| 4,396,568 | A | 8/1983 | Voll et al. | |
| 4,436,128 | A * | 3/1984 | Pointer | 152/209.11 |
| 4,680,317 | A | 7/1987 | Kuhnel et al. | |
| 5,147,477 | A | 9/1992 | Mouri et al. | 152/209 |
| 5,181,976 | A | 1/1993 | Iwafune et al. | 152/209 |
| 5,746,850 | A * | 5/1998 | Luscher et al. | 152/339.1 |
| 5,788,786 | A | 8/1998 | Yamauchi et al. | 152/209 |
| 6,021,831 | A | 2/2000 | Yamauchi et al. | 152/209 |
| 6,697,772 | B2 * | 2/2004 | Mancosu et al. | 156/110.1 |
| 2002/0049574 | A1 * | 4/2002 | Kabe et al. | 703/6 |
| 2005/0034798 | A1 * | 2/2005 | Bright | 152/209.6 |
| 2005/0103415 | A1 * | 5/2005 | Lukich et al. | 152/209.12 |

FOREIGN PATENT DOCUMENTS

| | | | |
|---|---|---|---|
| DE | 4037714 | A1 | 5/1991 |
| DE | 4117621 | A1 | 12/1991 |
| EP | 653317 | * | 5/1995 |
| GB | 12865 | * | 0/1896 |

(Continued)

*Primary Examiner*—Steven D. Maki
(74) *Attorney, Agent, or Firm*—Khorsandi Patent Law Group, A Law Corporation; Marilyn R. Khorsandi

(57) ABSTRACT

The invention relates to a method of making an outer tire layer on a pneumatic tire microcellular closed-cell sponge rubber, method of making the aforesaid product.

8 Claims, 4 Drawing Sheets

FOREIGN PATENT DOCUMENTS

| | | | |
|---|---|---|---|
| JP | 60-234004 | * | 11/1985 |
| JP | 03088832 | | 4/1991 |
| JP | 03167006 | | 7/1991 |
| JP | 9-156322 | * | 6/1997 |
| JP | 10-305714 | * | 11/1998 |
| JP | 11254909 | | 9/1999 |
| WO | WO88/08860 | A1 | 11/1988 |

* cited by examiner

MICRO-CELLULAR CLOSED-CELL SPONGE RUBBER OUTERS

CROSS-REFERENCE TO RELATED APPLICATIONS

This is a U.S. National Stage Application of International Application No. PCT/USO1/43636, International Filing Date Nov. 14, 2001, which claims benefit of U.S. Provisional Patent Application. Ser. No. 60/248,401 filed Nov. 14. 2000.

FIELD OF THE INVENTION

The field of the present invention is rubber outer layers, and specifically micro-cellular closed-cell sponge rubber outer layers for pneumatic tires, shoe soles and other applications.

BACKGROUND OF THE INVENTION

According to conventional philosophies, pneumatic rubber tire outers are made exclusively of a relatively hard durable solid rubber. However, the characteristics of relatively hard non-sponge ("solid") rubber do not favorably support the special needs of certain sports vehicles, such as mountain bikes, bicycle motorcross ("bmx") vehicles, cross-country bicycles, All Terrain Vehicles ("ATV"), and go-carts. Similarly, the characteristics of relatively hard solid rubber do not favorably support the needs of certain other types of special vehicles, including for example, wheelchairs, baby joggers, skateboards, rollerblades, scooters, motorcross vehicles, and others.

Pneumatic mountain bicycle tire outers have conventionally been made with relatively hard durable solid rubber. Relatively hard durable solid rubber is used in making the outers for such tires under the conventional thinking that because a mountain biking tire is subjected to high-friction conditions, the characteristics of relatively hard durable solid rubber will provide long wear.

There are a number of problems, however, with such tires. For example, relatively hard solid rubber does not have a high-friction coefficient—in most cases, the harder the rubber, the lower the friction coefficient of the rubber. Therefore, most conventional relatively hard solid rubber tires do not provide good traction characteristics.

Another problem with pneumatic tires made with relatively hard solid rubber outers is that they do not exhibit good shock absorption characteristics. In the case of mountain bikes, shock absorption is a critical factor in the design of such bikes. Mountain bikes can cost ten times the amount of a regular street bicycle—much of the cost being devoted to providing highly-advanced shock absorption characteristics to various structural features of the bicycle. After spending thousands of dollars on a highly-advanced shock absorbing bike frame, the mountain biker then mounts pneumatic tires made of relatively hard solid rubber that characteristically exhibit low shock-dampening characteristics—that is, they bounce.

Soft rubber exhibits higher-friction coefficient characteristics than harder rubber. However, soft rubber does not wear well and further does not exhibit significantly reduced dampening characteristics as compared to harder rubber.

Sponge rubber exhibits high-dampening and high-friction coefficient characteristics. However, a sponge rubber made using very soft rubber would not exhibit durability characteristics necessary for pneumatic tires.

As with pneumatic tire rubber outers, rubber outers, that is, an outer layer of rubber, in other applications that are often subjected to high-wear, high-friction conditions, such as, for example, shoe sole outers, are often made with relatively hard durable solid rubber according to the conventional thinking that the relatively hard durable solid rubber will provide long wear. However, as with tires, shoe sole outers (outsoles) and other rubber outers made according to this conventional thinking do not exhibit high-friction coefficient or shock-absorbing characteristics.

SUMMARY OF THE INVENTION

The present invention provides a method for formulating with relatively hard solid rubber, a micro-cellular closed-cell sponge rubber outer such as for use as an outer tire layer (a "tire outer") on pneumatic tires or for use as a component of shoe sole outers, said method comprising blowing a relatively hard non-sponge (or "solid") rubber having a first hardness scale measurement with a micro-cellular closed-cell inducing blowing agent to produce a micro-cellular closed-cell sponge rubber with a second hardness scale measurement, wherein the second hardness scale measurement is less than the first hardness scale measurement.

The term "outer" is used herein to mean an outer layer. In the case of pneumatic tires, an outer layer of rubber (a tire "outer") is bonded to a non-stretch or limited-stretch pneumatic tire lining. In the case of shoe soles, an outer layer of shoe sole material (a shoe sole outer, sometimes referred to in the shoe industry as an outsole) is fastened or vulcanized to a shoe upper, or is fastened or vulcanized to a midsole and shoe upper. The way in which a tire outer is fastened to a pneumatic tire lining is not a limitation of the present invention. The way in which a shoe sole outer is fastened or vulcanized to a shoe upper, or to a midsole and shoe upper, or to any other innersole, midsole, and shoe upper configuration is not a limitation of the present invention.

The words "non-sponge" and "solid" are used interchangeably in the disclosure of this invention. It will be understood by someone with ordinary skill in the art that blowing a relatively hard non-sponge solid rubber with a micro-cellular closed-cell inducing blowing agent will produce a micro-cellular closed-cell rubber having higher dampening characteristics and a higher friction coefficient than the solid rubber from which the sponge rubber is produced. An outer tire layer so formulated would be for use on pneumatic tires for any of a variety of vehicles, including but not limited to: mountain bikes, cross-country bicycles, All Terrain Vehicles ("ATV"), off-road vehicles, go-carts, wheelchairs, baby joggers, skateboards, rollerblades, scooters, motorcross vehicles, and others.

The present invention also provides a method for manufacturing pneumatic rubber tires, said method comprising vulcanizing an outer tire layer of micro-cellular closed-cell sponge rubber formulated from relatively hard non-sponge rubber, and bonding the outer tire layer to a non-stretch or limited-stretch pneumatic tire lining. Pneumatic tire linings, often made of nylon material, are sometimes referred to as "non-stretch." However, it will be understood by someone with ordinary skill in the art of tire making that nylon and other pneumatic tire lining material "stretch" to a limited extent. Therefore, reference herein to "non-stretch" or "limited-stretch" pneumatic tire lining material means pneumatic tire lining material, such as nylon, that stretches only to a limited extent.

The present invention also provides a method for manufacturing pneumatic rubber tires, said method comprising vulcanizing an outer tire layer comprising micro-cellular closed-cell sponge rubber formulated from relatively hard non-sponge rubber, said outer tire layer further comprising non-sponge rubber, and bonding the outer tire layer to a non-stretch or limited-stretch pneumatic tire lining.

The present invention provides a method for manufacturing pneumatic rubber tires, said method comprising molding an outer tire layer of micro-cellular closed-cell sponge rubber formulated from relatively hard non-sponge rubber, and bonding the molded outer tire layer to a non-stretch or limited-stretch pneumatic tire lining.

The present invention further provides a method for manufacturing pneumatic rubber tires, said method comprising bonding an outer tire layer of micro-cellular closed-cell sponge rubber formulated from relatively hard non-sponge rubber to a non-stretch or limited-stretch pneumatic tire lining.

The present invention further provides a method for manufacturing pneumatic rubber tires, said method comprising bonding an outer tire layer comprising micro-cellular closed-cell sponge rubber formulated from relatively hard non-sponge rubber and further comprising non-sponge rubber, to a non-stretch or limited-stretch pneumatic tire lining. The present invention also provides a pneumatic rubber tire, said pneumatic rubber tire comprising an outer tire layer comprising micro-cellular closed-cell sponge rubber formulated from relatively hard non-sponge rubber wherein the outer tire layer is bonded to a non-stretch, or limited-stretch, pneumatic tire lining.

The present invention also provides a pneumatic rubber tire, said pneumatic rubber tire comprising an outer tire layer comprising micro-cellular closed-cell sponge rubber formulated from relatively hard non-sponge rubber and further comprising non-sponge rubber wherein the outer tire layer is bonded to a non-stretch, or limited-stretch, pneumatic tire lining.

The present invention further provides a method for manufacturing shoe sole outers, said method comprising vulcanizing micro-cellular closed-cell sponge rubber formulated from relatively hard non-sponge rubber with non-sponge rubber in a shoe sole outer mold.

The present invention further provides a shoe sole outer (also sometimes referred to as an outsole), said shoe sole outer comprising micro-cellular closed-cell sponge rubber formulated from relatively hard non-sponge rubber and further comprising non-sponge rubber.

BRIEF DESCRIPTION OF THE DRAWINGS

These and other features of the present invention are more fully set forth in the following description of exemplary embodiments of the invention. The description is presented with reference to the accompanying drawings in which.

DETAILED DESCRIPTION OF THE INVENTION

Figure 2:
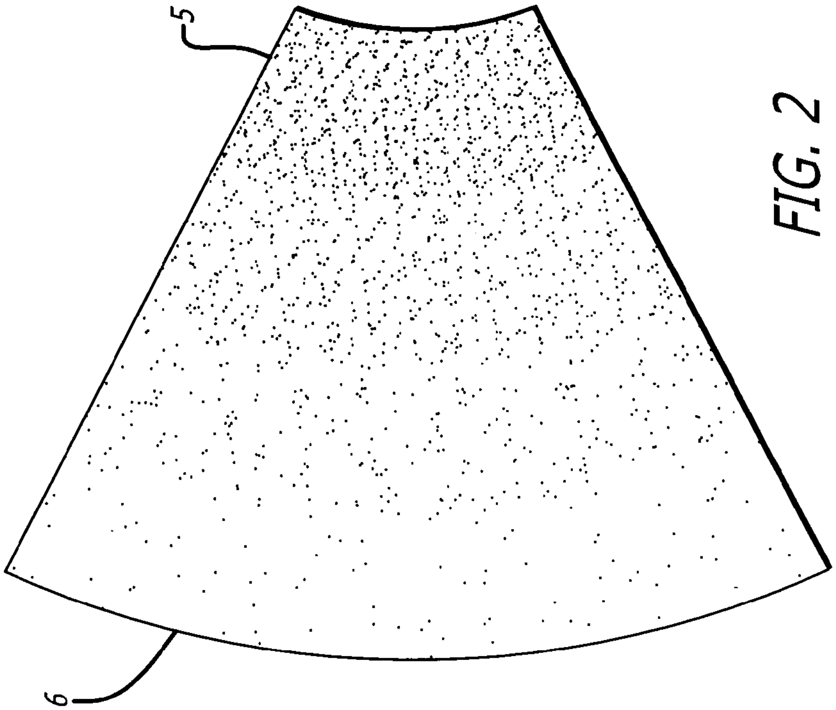
FIG. 2 is a graphic representation that depicts, under extreme magnification, an exemplary uneven density distribution of gas pockets that sometimes results from micro-cellular, closed-cell sponge rubber vulcanization.

The making of sponge rubber is well known in the art of rubber making. One of a variety of “blowing agents” is used in the rubber formulation process to create a multitude of gas pockets in the final rubber product.

Instead of using soft rubber, according to the present invention, blowing agents are added to relatively hard solid rubber formulations to create a relatively hard rubber sponge rubber. The relatively hard rubber sponge rubber is then used to make an outer tire layer for pneumatic tires. The exemplary description of methods of formulating relatively hard rubber sponge rubber for, and manufacturing, a mountain bike tire is illustrative and is not a limitation of the invention.

Various blowing agents provide different types of results. Proportions being equal, some blowing agents tend to create a smaller number of, but large-sized, air or gas pockets; whereas other blowing agents tend to create a higher number of, but smaller-sized air or gas pockets.

Some blowing agents produce what is known in the art as “open cell” sponge. Such blowing agents produce air pockets that are open. Such open air pockets can be useful when the rubber is intended for water absorption products.

Other blowing agents produce what is known as “closed cell” sponge. Such blowing agents produce gas pockets in rubber such that each gas pocket is encapsulated with the rubber.

The present invention provides that blowing agents that produce micro-cellular, closed-cell sponge are used to “blow” relatively hard solid rubber. The book entitled *Blue Book* 1997*: Materials, compounding ingredients, machinery and services for the rubber industry*, Job H. Lippincott publisher, published by Rubber World magazine, a Lippincott & Peto publication, contains a list of rubber blowing agents on pages 312-318, the factual content of which is incorporated by reference herein for all purposes as if fully stated here and selected portions of the factual content of which are provided below.

The Blue Book lists a number of blowing agents by Tradename, composition and Supplier; properties and function and compounding are described for each blowing agent listed. The Blue Book list of Blowing Agents is extensive. Accordingly, exemplary blowing agent compositions are identified below. The following list of exemplary micro-cellular, closed-cell sponge inducing blowing agent compositions is illustrative and is not a limitation of the blowing agents that can be used in the present invention.

Exemplary blowing agent compositions listed in the Blue Book that produce microcellular, closed-cell sponge include: Azodicarbonamide (including Activated and Modified forms), p-toluene sulfonylhydrazide (TSH), Sodium bicarbonate and Dinitroso pentamethylene tetramine (DNPT). Someone with ordinary skill in the art of rubber making will understand that use of other micro-cellular, closed-cell sponge inducing blowing agent compositions is possible without deviating from the spirit of the invention. Someone with ordinary skill in the art of rubber making will further understand that considerations for selection of a blowing agent include the form (dust, paste, etc.) preferred, and the temperature for vulcanizing a particular rubber formulation. Further, the function and compounding requirements are specific to each blowing agent composition, and to some extent, to each formulation marketed under the respective Tradenames listed in the Blue Book. Someone with ordinary skill in the art of rubber making will understand the blowing agent-specific function and compounding requirements.

The Blue Book identifies a number of Tradenames under which Activated Azodicarbonamide can be purchased, including, among others: Celogen 754 (Uniroyal Chemical, supplier), Celogen 785A (Uniroyal Chemical, supplier), and Celogen 700 (Uniroyal Chemical, supplier). The Blue Book identifies a number of Tradenames under which Azodicarbonamide can be purchased, including, among others: Celogen AZ (Uniroyal Chemical, supplier), Expancel AZ (Proquitec Industrie, supplier), Porofor ADC/F (Bayer Fibers, Organics & Rubber Division, supplier), Porofor ADC/M (Bayer Fibers, Organics & Rubber Division, supplier), and Unicell D (Dong Jin (USA), supplier). The Blue Book identifies a number of Tradenames under which Modified Azodicarbonamide can be purchased, including, among others: Ficel (Schering Berlin, supplier) and Unicell DX (Dong Jin (USA), supplier). The Blue Book, page 316, identifies the Properties of one Azodicarbonamide composition, marketed under the Tradename of Porofor ADC/M as: "SP gr. 1.6. Yellow powder. Decomposition temp. not below 205° C. Volume of gas released about 220 ml/g." The Blue Book, page 316, identifies the Function and Compounding of Porofor ADC/M as: "A nitrogen liberating blowing agent for the manufacture of odorless, cellular vulcanizates. Especially suitable for the manufacture of articles to be cured at relatively high temperatures (e.g. microcellular profiles in LCM devices)."

The Blue Book identifies a number of Tradenames under which p-toluene sulfonylhydrazide can be purchased, including, among others: Biofoam SH (Rit-Chem supplier); Celogen TSH (Uniroyal Chemical, supplier); Expencel TSH (Proquitec Industira, supplier); and Unicell H (Dong Jin (USA), supplier). The Blue Book, page 314, describes the properties for one of the preceding exemplary TSH blowing agent compositions (Celogen TSH) as: "Sp gr. 1.42. Cream colored crystalline powder. Melting point, 125-150° C. (257-302° F.). Decomposition range, 110-120° C. (230-250° F.). Amount of nitrogen gas, 115 cc/gm STP." The Blue Book, page 314, further describes the function and compounding for one of the preceding exemplary TSH blowing agent compositions (Celogen TSH) as: "A low temperature blowing agent for NR, SBR, NBR, LLR, CR and silicone rubber. Nitrogen blowing agent; produces odorless cellular rubber goods; nondiscoloring and nonstaining; slightly activating to the cure. Celogen TSH is a superior blowing agent for the expansion of liquid polysulfide rubbers at room temp.".

The Blue Book identifies a number of Tradenames under which Sodium bicarbonate can be purchased, including, among others: Dynacarb (Littlem Corporation, supplier). The Blue Book, page 314, describes the properties for Dynacarb as: "Sp gr. 2.18 free flowing, non-dusting fine white powder." The Blue Book, page 314, describes the function and compounding for Dynacarb as: "Small particle size for sponge compounds."

The Blue Book identifies a number of Tradenames under which Dinitroso pentamethylene tetramine (DNPT) can be purchased, including, among others: Opex (Uniroyal Chemical, supplier), and Unicell G (Dong Jin (USA), supplier). The Blue Book, page 316, describes the properties for Opex as: "DNPT on an inert carrier—80% active. Pale yellow powder. Opex is flammable and should be kept away from all sources of heat, open flame and sparks. Strong acids and acidic salts will cause rapid decomposition of Opex. Incompatible with oxidizing and reducing agents." The Blue Book, page 314, describes the function and compounding for Opex as: "Especially effective in pressure procured closed cell applications of SBR, CR, NBR and EPDM. Also, imparts a fine cellular structure in extrusion processes. At cure temperature of 130° C. (288° F.) and higher. Opex and some of its decompositon products show a definite cure activation in both natural and synthetic rubber sponge. Used in the manufacture of open and closed cell sponge in a wide range of densities with uniform cell structure."

The proportion of the blowing agent used and the particular rubber formulation used determines the final dampening and friction coefficient characteristics of the sponge rubber produced. Performance characteristics desirable for an intended use of the rubber to be produced directs the proportion of the blowing agent and the particular rubber formulation to be used.

The hardness of rubber can be measured with a device known in the art as a "durometer." A standard hardness scale known in the art is the "Shore A" scale. In an exemplary embodiment of the invention, a rubber with a hardness of approximately 65 to 70 on the Shore A scale is blown with a micro-cellular, closed-cell sponge inducing blowing agent until the resulting sponge rubber has a hardness of approximately 35 to 40 on the Shore A scale.

Figure 1:
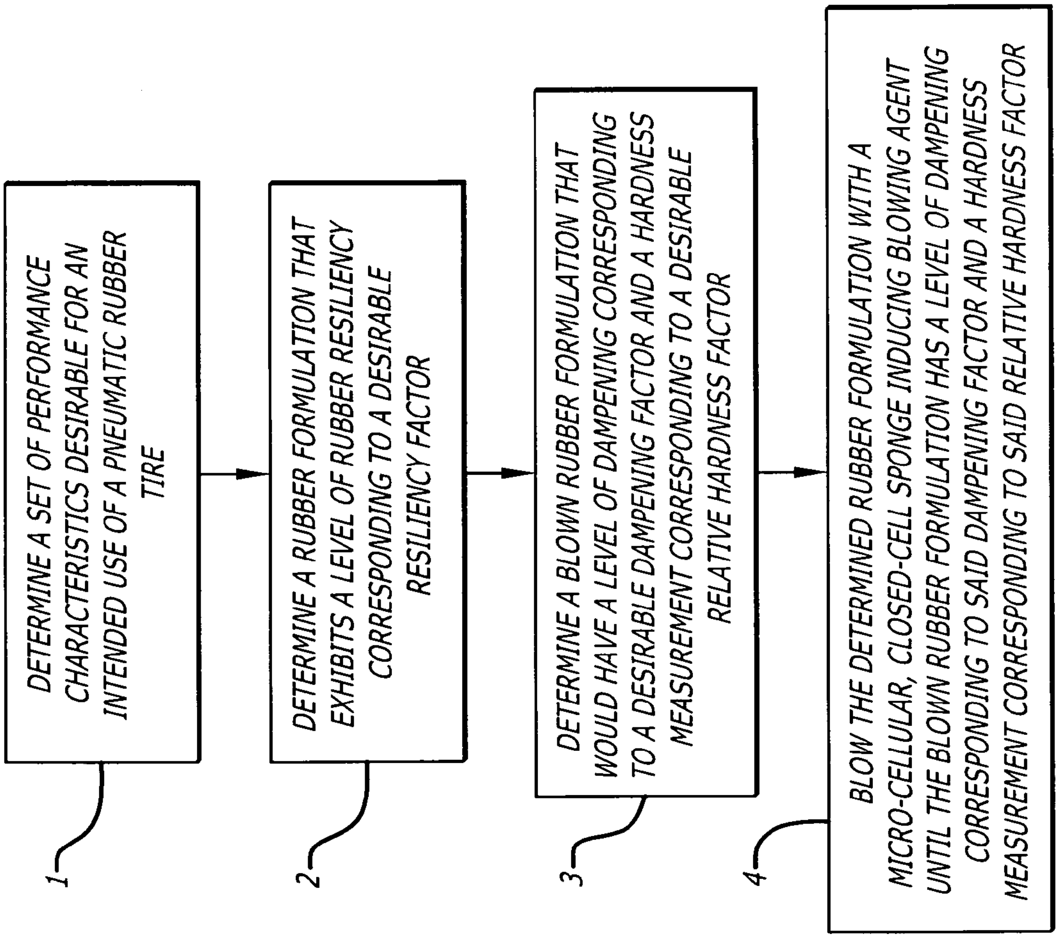
FIG. 1 is a high level flow diagram depicting the logic steps to determining a proportion of blowing and a rubber formulation with which to manufacture a rubber for a particular intended purpose.

FIG. 1 is a high level flow diagram depicting the logic steps to determining a proportion of blowing and a rubber formulation with which to manufacture a rubber for a particular intended purpose. The present invention provides for determining 1 a set of performance characteristics desirable for an intended use of a pneumatic rubber tire, said set of performance characteristics comprising a resiliency factor, a dampening factor, and a relative hardness factor. Then a rubber formulation is determined 2 that exhibits a level of rubber resiliency corresponding to said resiliency factor. A blown rubber formulation is then determined 3 that would have a level of dampening corresponding to said dampening factor and a hardness measurement corresponding to said relative hardness factor. The determined rubber formulation is then blown 4 with a micro-cellular, closed-cell sponge inducing blowing agent to produce the blown rubber formulation having a level of dampening corresponding to said dampening factor and a hardness measurement corresponding to said relative hardness factor. Rubbers that could be used would include SBR rubber (a synthetic "natural" rubber available from various suppliers), Stealth grade C4 (Supplier: Stone Age Equipment, Inc., Redlands, Calif., USA), Stealth grade S1 (Supplier: Stone Age Equipment, Inc., Redlands, Calif., USA), and natural rubber (available from various suppliers).

In one exemplary outer tire layer embodiment, blowing agent Celogen AZ (Uniroyal Chemical, supplier) is used to blow Stealth grade C4 (Supplier: Stone Age Equipment, Inc., Redlands, Calif., USA) rubber with a hardness of approximately 79 on the Shore A scale down to a hardness of approximately 40 on the Shore A scale. In a second exemplary outer tire layer embodiment, blowing agent Celogen AZ (Uniroyal Chemical, supplier) is used to blow Stealth grade S1 (Supplier: Stone Age Equipment, Inc., Redlands, Calif., USA) rubber with a hardness of approximately 72 down to a hardness of approximately 40 on the Shore A scale. In a third outer tire layer embodiment, blowing agent Celogen AZ (Uniroyal Chemical, supplier) is used to blow SBR rubber (a synthetic "natural" rubber available from various suppliers) with a hardness of approximately 70 on the Shore A scale down to a hardness of approximately 40 on the Shore A scale.

For example, in the case of downhill mountain bike racing, a tire, according to the invention, a micro-cellular, closed-cell sponge inducing blowing agent is used to blow a relatively hard, low resilience, high dampening rubber to create an outer tire layer of microcellular, closed-cell sponge. In an exemplary embodiment of a downhill mountain bike racing tire, a rubber with a hardness of approximately 60 to 65 on the Shore A scale is blown with a micro-cellular, closed-cell sponge inducing blowing agent until the resulting sponge rubber has a hardness of approximately 30 to 35 on the Shore A scale. Then, according to the invention, the outer tire layer is bonded to a non-stretch or limited-stretch pneumatic tire lining. Non-stretch, or limited-stretch, pneumatic tire linings are often made of nylon. Techniques for bonding a rubber layer to a non-stretch, or limited-stretch, nylon pneumatic tire lining are well known in the art of tire making.

In the case of cross-country bicycle racing, a tire with low rolling resistance is desirable. According to the invention, a micro-cellular, closed-cell sponge inducing blowing agent is used to blow a relatively hard, higher resiliency rubber to create an outer tire layer of micro-cellular, closed-cell sponge. In an exemplary embodiment of a cross-country bicycle racing tire, a rubber with a hardness of approximately 70 to 75 on the Shore A scale is blown with a micro-cellular, closed-cell sponge inducing blowing agent until the resulting sponge rubber has a hardness of approximately 40 to 45 on the Shore A scale. Then, according to the invention, the outer tire layer is bonded to a non-stretch, or limited stretch, pneumatic tire lining.

In the case of wet surface cycling, it is desirable to maximize surface contact. According to the invention, a micro-cellular, closed-cell sponge inducing blowing agent is used to blow a relatively hard non-sponge rubber to a lower level of hardness on the Shore A scale. The result is a sponge rubber with a higher density of micro-cellular closed-cell gas pockets. In an exemplary embodiment of a wet surface cycling tire, a rubber with a hardness of approximately 60 to 65 on the Shore A scale is blown with a micro-cellular, closed-cell sponge inducing blowing agent until the resulting sponge rubber has a hardness of approximately 30 to 35 on the Shore A scale. Then, according to the invention, the outer tire layer is bonded to a non-stretch, or limited-stretch, pneumatic tire lining.

As part of the vulcanization process for a micro-cellular, closed-cell sponge made according to the present invention, a "skin" will sometimes form on the outer surface of the rubber. Such a skin sometimes has fewer micro-cellular, closed-cell sponge gas pockets than rubber farther from the surface. FIG. 2 depicts, under extreme magnification, an uneven distribution of gas pockets. FIG. 2 depicts a reduction in the density of gas pockets from the interior 5 of the rubber, to the exterior 6 of the rubber in an exemplary micro-cellular, closed-cell sponge rubber vulcanization process. In some other alternative micro-cellular, closed-cell sponge rubber vulcanization processes, the density of gas pockets is more or less evenly distributed.

Figure 3:
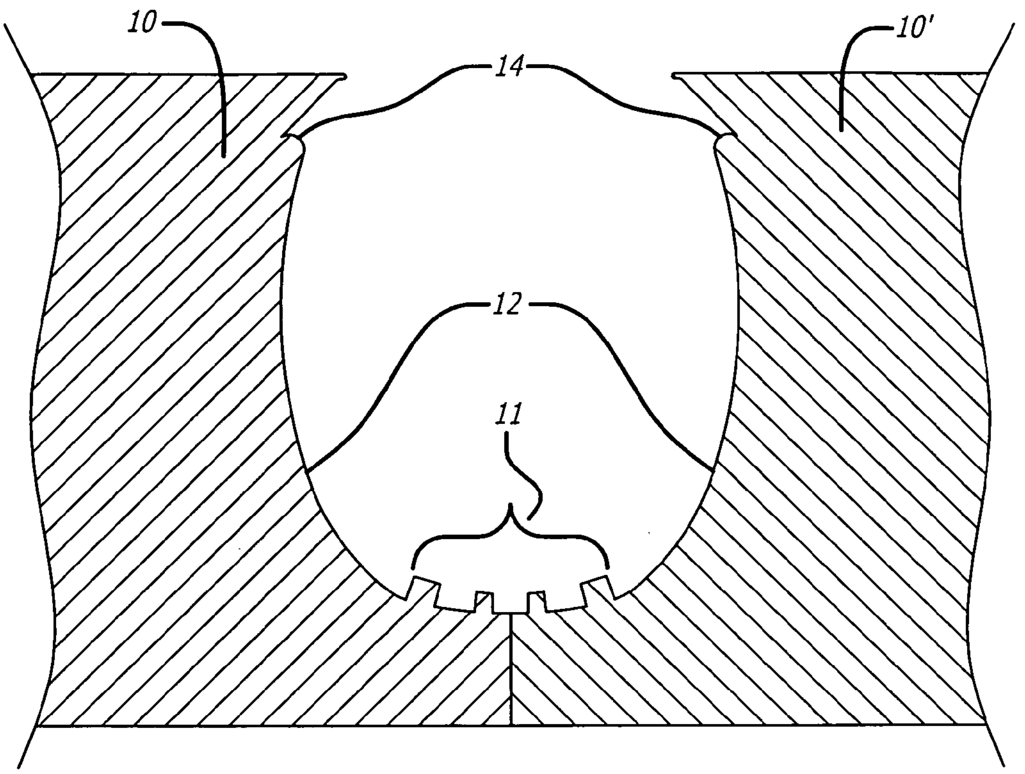
FIG. 3 is a cross-sectional view of an exemplary outer tire mold into which rubber is placed to form a tire outer in an exemplary embodiment of the present invention.

FIG. 3 is a cross-sectional view of an exemplary outer tire mold 10-10' into which rubber is placed to form a tire outer in an exemplary embodiment of the present invention. As depicted in FIG. 3, a typical tire mold comprises two separate pieces, e.g., 10 and 10', that are placed together. In an exemplary single-rubber outer embodiment of the present invention, micro-cellular closed-cell sponge rubber is placed in the mold to form a tire outer. As one with ordinary skill in the rubber arts will understand, pre-cured rubber is clay-like. To form a tire outer, rubber is placed in a mold, is pressed so that the rubber "flows" into the mold, and is then cured in a vulcanization process.

Figure 4:
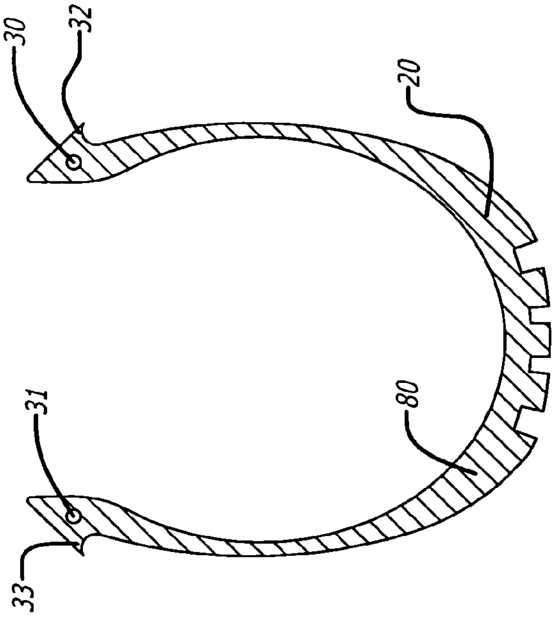
FIG. 4 is a cross-sectional view of an exemplary single-rubber tire outer in which micro-cellular closed-cell sponge rubber forms a tire outer in an exemplary single-rubber tire outer embodiment of the present invention.

FIG. 4 is a cross-sectional view of an exemplary single-rubber tire outer 20 in which micro-cellular closed-cell sponge rubber 80 forms a tire outer in an exemplary single-rubber tire outer embodiment of the present invention. As depicted in FIG. 4, as will be understood by someone with ordinary skill in the bicycle tire-making art, a bead, e.g., 30 and 31, such as one made with Kevlar or other aramid fiber, is inserted in the rubber placed in the mold 10 (FIG. 3). Further, as depicted in FIG. 3, the exemplary mold 10 provides detents 14 with which to form tire outer protrusions, e.g., 32 and 33 as depicted in FIGS. 4 through 7.

Figure 5:
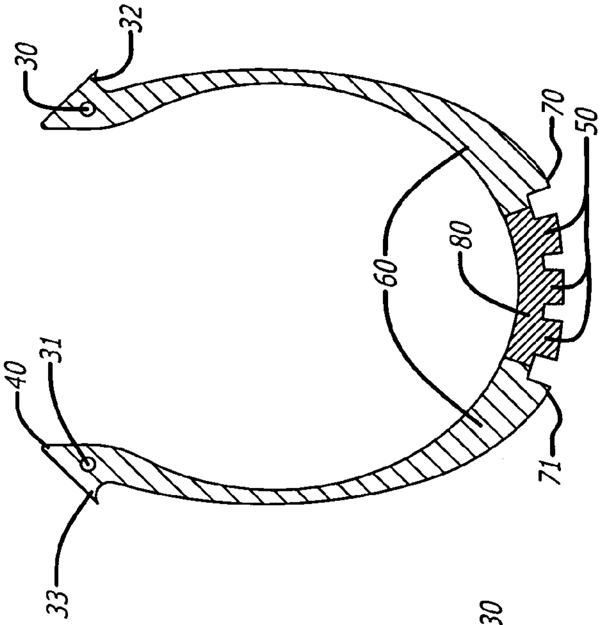
FIG. 5 is a cross-sectional view of an exemplary multi-rubber tire outer in which non-sponge rubber forms outer tire tread lugs and micro-cellular closed-cell sponge rubber forms inner tire tread lugs in a first exemplary multi-rubber tire outer embodiment of the present invention.

Additional modifications and variations of the above-described embodiments will be apparent to those with ordinary skill in the art without departing from the spirit of the invention. For example, it will be understood by someone with ordinary skill in the art that, without departing from the spirit of the invention, an outer tire layer comprising multiple types of rubber, each type of rubber provided in one or more particular areas of the outer surface of the tire, can be made using vulcanization. FIG. 5 is a cross-sectional view of an exemplary multi-rubber tire outer 40 in which hard, non-sponge rubber 60 forms outer tire tread lugs, 70-71 respectively, and micro-cellular closed-cell sponge rubber 80 forms inner tire tread lugs 50 in a first exemplary multi-rubber tire outer embodiment of the present invention.

To form the exemplary multi-rubber tire outer 40 depicted in FIG. 5, micro-cellular closed-cell sponge rubber 80 would be placed in the inner tire tread lug indentations 11 of the exemplary outer tire mold 10 as depicted in FIG. 3; hard, non-sponge rubber 60 would be placed in the outer tire tread lug indentations 12 of the exemplary outer tire mold 10 as depicted in FIG. 3. The rubber in the mold would then be cured using vulcanization. The rubbers comprising the micro-cellular closed-cell sponge rubber 80 and the hard, non-sponge rubber 60 would be selected according to criteria known in the art such that the two rubbers 80 and 60 would knit together forming long chains of molecules.

One selection criteria for selecting the two rubbers 80 and 60 that would knit together would be to blow rubber having the same composition as the non-sponge rubber 60 with a micro-cellular closed-cell inducing blowing agent to produce the micro-cellular closed-cell sponge rubber 80.

Figure 6:
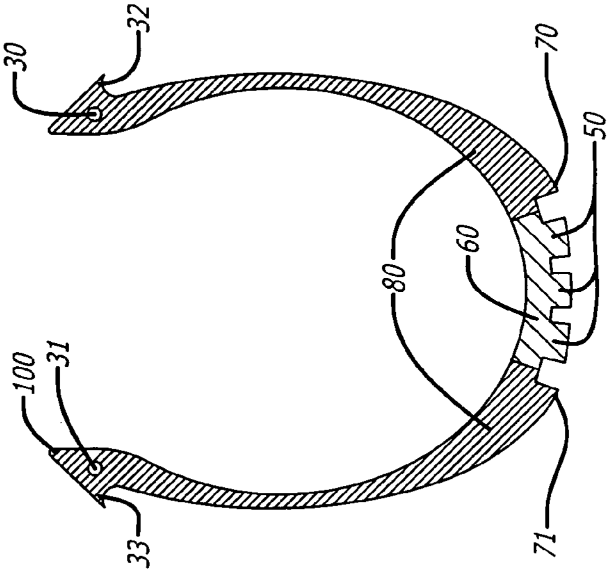
FIG. 6 is a cross-sectional view of an exemplary multi-rubber tire outer in which non-sponge rubber forms inner tire tread lugs micro-cellular closed-cell sponge rubber forms outer tire tread lugs in a second exemplary multi-rubber tire outer embodiment of the present invention.

FIG. 6 is a cross-sectional view of an exemplary multi-rubber tire outer 100 in which hard, non-sponge rubber 60 forms inner tire tread lugs 50 and in which micro-cellular closed-cell sponge rubber 80 forms outer tire tread lugs 70-71 in a second exemplary multi-rubber tire outer embodiment of the present invention.

Figure 7:
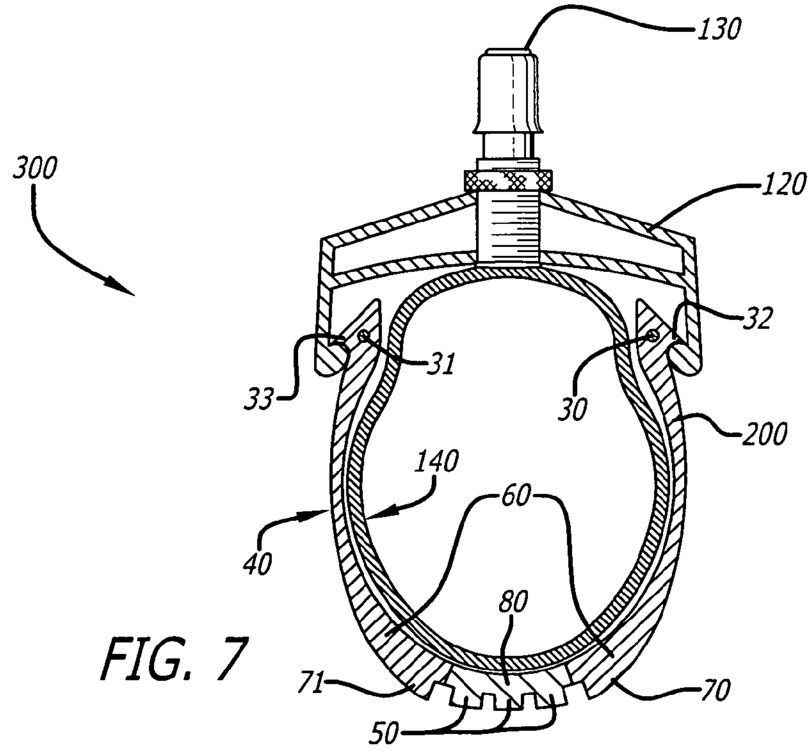
FIG. 7 is a cross-sectional view of an exemplary assembled bicycle tire comprising a multi-rubber tire outer in a first alternative exemplary embodiment of the present invention.

Once a tire outer, e.g., 20, 40, 100 has been formed according to the present invention, the tire outer, e.g., 20, 40, 100 is bonded to a non-stretch or limited-stretch pneumatic tire lining. The resulting bonded tire assembly 200 as depicted in FIG. 7 can be assembled with other parts, e.g., a tire rim 120 to form a bicycle tire 300 as depicted in FIG. 7. FIG. 7 is a cross-sectional view of an exemplary assembled bicycle tube tire 300 comprising a multi-rubber tire outer 40 bonded to a pneumatic tire lining to form a bonded tire assembly 200 in the first alternative exemplary embodiment of the present invention. As depicted in FIG. 7, a tube 140 is filled with air to inflate the outer bonded tire assembly 200. In a tubeless pneumatic tire (not pictured), air used to inflate the outer bonded tire assembly 200 is sealed between the rim 120 and the tire outer protrusions 32 and 33.

Figure 11:
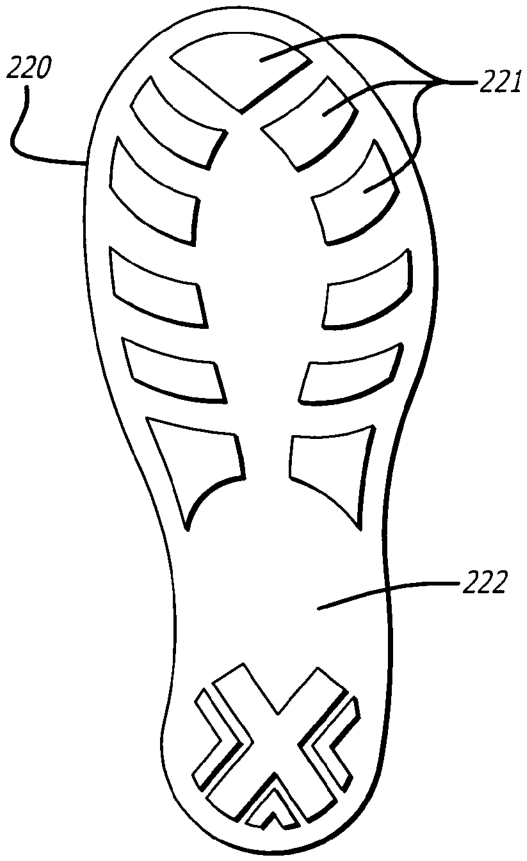
FIG. 11 is a bottom view of an exemplary shoe sole outer comprising micro-cellular closed-cell sponge rubber and non-sponge rubber.
Figure 9:
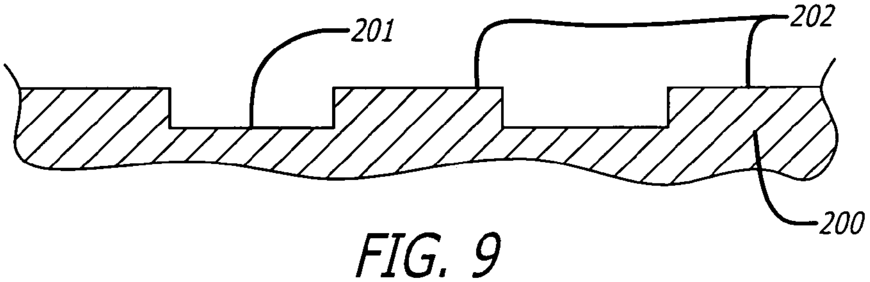
FIG. 9 is a cross-sectional view of a portion of the exemplary shoe mold.
Figure 10:
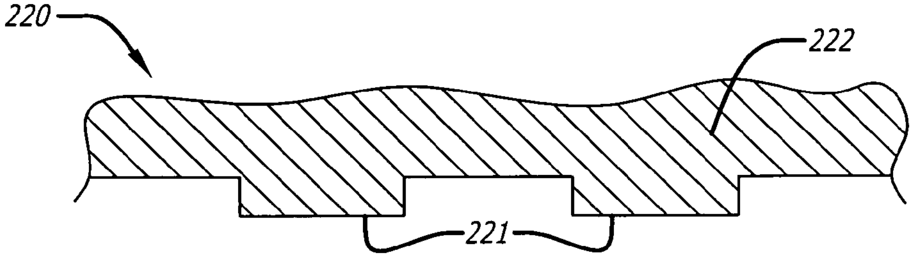
FIG. 10 is a cross-sectional view of a portion of an exemplary shoe sole outer comprising micro-cellular closed-cell sponge rubber and non-sponge rubber.

The present invention further provides a method for manufacturing shoe sole outers, e.g., 220 as shown in FIGS. 10-11. The present invention further provides a shoe sole outer, e.g., 220 that is made by vulcanizing micro-cellular closed-cell sponge rubber 222 (as depicted in FIGS. 10-11) formulated from relatively hard non-sponge rubber with non-sponge rubber 221 (as depicted in FIGS. 10-11) in a shoe sole outer mold 210 (as depicted in FIGS. 8-9).

Figure 8:
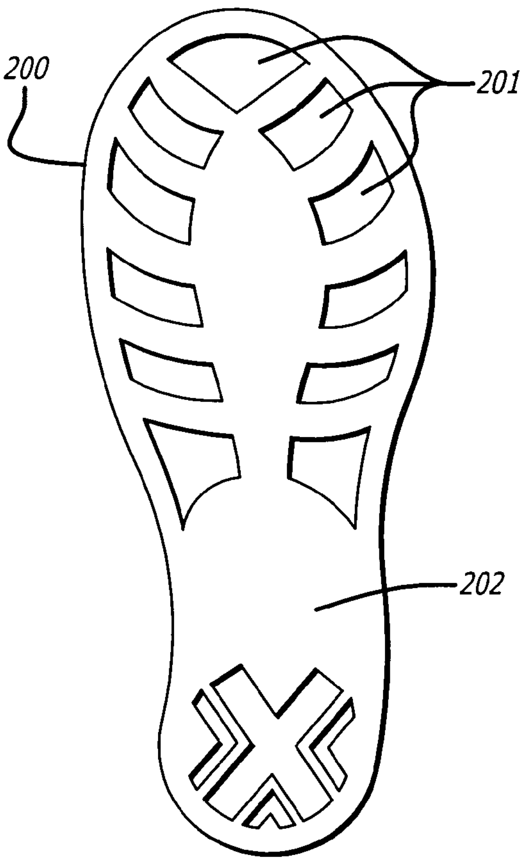
FIG. 8 is a top view of an exemplary shoe mold.

FIG. 8 is a top view of an exemplary shoe mold and FIG. 9 is a cross-sectional view of a portion of the exemplary shoe mold. In a way similar to that described above for placing clay-like uncured rubber in a tire mold, uncured solid rubber would be placed in the shoe sole "tread" indentations 201 in the mold 200; uncured micro-cellular closed-cell sponge rubber would be placed in the shoe sole mold 200 on top of the previously placed uncured solid rubber. The rubber would then be pressed to flow into the mold. The molded shoe outer would then be cured using vulcanization so that non-sponge solid rubber would "knit" with the micro-cellular closed cell sponge rubber. FIG. 10 is a cross-sectional view of a portion of an exemplary shoe sole outer comprising micro-cellular closed-cell sponge rubber and non-sponge rubber. FIG. 11 is a bottom view of an exemplary shoe sole outer comprising micro-cellular closed-cell sponge rubber and non-sponge rubber. In an exemplary shoe sole outer embodiment, blowing agent Celogen AZ (Uniroyal Chemical, supplier) is used to blow Stealth grade S1 (Supplier: Stone Age Equipment, Inc., Redlands, Calif., USA) rubber with a hardness of approximately 72 down to a hardness of approximately 50 on the Shore A scale.

In an alternative exemplary shoe sole outer embodiment, uncured micro-cellular closed-cell sponge rubber would be placed in the shoe sole "tread" indentations 201 in the mold 200; uncured solid rubber would be placed in the shoe mold 200 on top of the previously placed uncured micro-cellular closed-cell sponge rubber.

ILLUSTRATIVE EMBODIMENTS

Although the present invention has been described in certain specific embodiments, many additional modifications and variations would be apparent to those skilled in the art. It is, therefore, to be understood that this invention may be practiced otherwise than as specifically described. Thus, the embodiments of the present invention described herein should be considered in all respects as illustrative and not restrictive, the scope of the invention to be determined by the appended claims and their equivalents rather than the foregoing description.

What is claimed is:

1. A method for manufacturing multi-rubber tire outers, said method comprising:

vulcanizing a tire outer that comprises an inner surface, an outer surface, a first portion, a second portion, a third portion, a fourth portion, and a fifth portion, wherein the first portion of the tire outer extends from a first portion of the inner surface of the tire outer to a first portion of the outer surface of the tire outer, wherein the first portion of the tire outer consists of micro-cellular, closed-cell sponge rubber formulated from relatively hard solid rubber, wherein the outer surface of the first portion of the tire outer comprises inner tire tread lugs, wherein the second portion of the tire outer extends from a second portion of the inner surface of the tire outer to a second portion of the outer surface of the tire outer, wherein the second portion of the tire outer consists of non-sponge rubber, wherein the third portion of the tire outer extends from a third portion of the inner surface of the tire outer to a third portion of the outer surface of the tire outer, wherein the third portion of the tire outer consists of non-sponge rubber, wherein the fourth portion of the tire outer comprises rubber and a first tire bead, and wherein the fifth portion of the tire outer comprises rubber and a second tire bead.

2. The method of claim 1, said method further comprising bonding the tire outer to a pneumatic tire lining.

3. A method for manufacturing multi-rubber pneumatic tires, said method comprising:

(A) blowing a relatively hard solid rubber having a first hardness scale measurement with a micro-cellular, closed-cell inducing blowing agent to produce a micro-cellular, closed-cell sponge rubber having a second hardness scale measurement, wherein the second hardness scale measurement is less than the first hardness scale measurement;

(B) vulcanizing a multi-rubber tire outer that comprises an inner surface, an outer surface, a first portion, a second portion, a third portion, a fourth portion, and a fifth portion, wherein the first portion of the multi-rubber tire outer consists of the micro-cellular, closed-cell sponge rubber produced in (A), wherein the first portion of the multi-rubber tire outer extends from a first portion of the inner surface of the multi-rubber tire outer to a first portion of the outer surface of the multi-rubber tire outer, wherein the second portion of the multi-rubber tire outer consists of non-sponge rubber, wherein the second portion of the multi-rubber tire outer extends from a second portion of the inner surface of the multi-rubber tire outer to a second portion of the outer surface of the multi-rubber tire outer, wherein the outer surface of the second portion of the multi-rubber tire outer comprises inner tire tread lugs, wherein the third portion of the multi-rubber tire outer consists of micro-cellular, closed-cell sponge rubber produced in (A), wherein the third portion of the multi-rubber tire outer extends from a third portion of the inner surface of the multi-rubber tire outer to a third portion of the outer surface of the multi-rubber tire outer, wherein the fourth portion of the multi-rubber tire outer comprises rubber and a first tire outer edge, wherein the fourth portion of the multi-rubber tire outer further comprises a first tire bead imbedded in the first tire outer edge, wherein the fifth portion of the multi-rubber tire outer comprises rubber and a second tire outer edge, wherein the fifth portion of the multi-rubber tire outer further comprises a second tire bead imbedded in the second tire outer edge; and (C) assembling a tire carcass comprising bonding the tire outer of (B) to a pneumatic tire lining.

4. The method of claim 1 wherein the relatively hard solid rubber has a first hardness scale measurement of approximately 70 to 79 on a Shore A scale of hardness and wherein the micro-cellular, closed-cell sponge rubber has a second hardness scale measurement of approximately 40 on the Shore A scale of hardness.

5. The method of claim 1 wherein the relatively hard solid rubber has a first hardness scale measurement of approximately 60 to 65 on a Shore A scale of hardness and wherein the micro-cellular, closed-cell sponge rubber has a second hardness scale measurement of approximately 30 to 35 on the Shore A scale of hardness.

6. A method for manufacturing pneumatic tires, said method comprising:

bonding a tire outer to a pneumatic tire lining, wherein the tire outer comprises an inner surface, an outer surface, a first edge, a second edge, a first tire bead and a second tire bead, wherein the tire outer extends from the first tire bead embedded in the first edge of the tire outer to the second tire bead embedded in the second edge of the tire outer, and wherein the tire outer further comprises:

a first portion of the tire outer consisting of micro-cellular, closed-cell sponge rubber formulated from relatively hard solid rubber, wherein the first portion of the tire outer extends from a first portion of the inner surface of the tire outer to a first portion of the outer surface of the tire outer;

a second portion of the tire outer consisting of non-sponge rubber, wherein the second portion of the tire outer extends from a second portion of the inner surface of the tire outer to a second portion of the outer surface of the tire outer; and a third portion of the tire outer consisting of non-sponge rubber, wherein the third portion of the tire outer extends from a third portion of the inner surface of the tire outer to a third portion of the outer surface of the tire outer, wherein the first portion of the tire outer is between the second portion of the tire outer and the third portion of the tire outer.

7. A pneumatic tire, said pneumatic tire comprising:

(A) a rubber tire outer comprising:

1) a first edge disposed around a first tire bead, 2) a second edge disposed around a second tire bead, 3) an inner surface, 4) an outer surface, 5) a first portion extending from a first portion of the inner surface of the rubber tire outer to a first portion of the outer surface of the rubber tire outer, wherein the first portion of the rubber tire outer consists of micro-cellular, closed-cell sponge rubber formulated from relatively hard solid rubber, wherein the first portion of the outer surface of the tire outer comprises inner tire tread lugs;

6) a second portion extending from a second portion of the inner surface of the rubber tire outer to a second portion of the outer surface of the rubber tire outer, wherein the second portion of the rubber tire outer consists of non-sponge rubber;

7) a third portion extending from a third portion of the inner surface of the rubber tire outer to a third portion of the outer surface of the rubber tire outer, wherein the third portion of the rubber tire outer consists of non-sponge rubbers wherein the first portion of the rubber tire outer is disposed in between the second portion and the third portion;

(B) a pneumatic tire lining, wherein the inner surface of the rubber tire outer is bonded to the pneumatic tire lining.

8. A pneumatic tire, said pneumatic tire comprising:

(A) a tire outer comprising:

(1) a first edge disposed around a first tire bead, (2) a second edge disposed around a second tire bead, (3) an inner surface comprising a first portion, a second portions and a third portion, (4) an outer surface comprising a first portion, a second portion and a third portion, (5) a first portion of the tire outer that extends from the first portion of the inner surface of the tire outer to the first portion of the outer surface of the tire outer, wherein the first portion of the tire outer consists of non-sponge rubber, wherein the first portion of the outer surface of the tire outer comprises inner tire tread lugs, (6) a second portion of the tire outer that extends from the second portion of the inner surface of the tire outer to the second portion of the outer surface of the tire outer, wherein the second portion of the tire outer consists of micro-cellular, closed-cell sponge rubber formulated from relatively hard solid rubber, and (7) a third portion of the tire outer that extends from the third portion of the inner surface of the tire outer to the third portion of the outer surface of the tire outer, wherein the third portion of the tire outer consists of micro-cellular, closed-cell sponge rubber formulated from relatively hard solid rubber; and (B) a pneumatic tire lining, wherein the inner surface of the tire outer is bonded to the pneumatic tire lining.

* * * * *